(12) United States Patent
Ebinger

(10) Patent No.: US 6,460,561 B1
(45) Date of Patent: Oct. 8, 2002

(54) VALVE PISTON AND VALVE EQUIPPED WITH SAME

(75) Inventor: Günter Ebinger, Rheinmünster-Stollhofen (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/419,013

(22) Filed: Oct. 13, 1999

(30) Foreign Application Priority Data

Oct. 28, 1998 (DE) ............................. 198 49 635

(51) Int. Cl.$^7$ ........................ F16K 31/122; F16K 29/02
(52) U.S. Cl. ................... 137/331; 137/625.66; 251/126
(58) Field of Search ........................... 137/330, 331, 137/625.66; 251/126

(56) References Cited

U.S. PATENT DOCUMENTS

| | | | | | |
|---|---|---|---|---|---|
| 1,908,396 | A | * | 5/1933 | Albright | 137/331 |
| 1,966,841 | A | * | 7/1934 | Zelov | 137/331 |
| 2,904,075 | A | * | 9/1959 | Markson | 137/331 |
| 3,159,173 | A | * | 12/1964 | Fremon | 137/331 |
| 3,504,696 | A | * | 4/1970 | McCurley | 137/331 |
| 3,964,372 | A | * | 6/1976 | Chatterjea | 251/126 |
| 4,069,843 | A | * | 1/1978 | Chatterjea | 251/126 |
| 4,265,272 | A | * | 5/1981 | Klimowicz | 251/126 |
| 4,319,608 | A | * | 3/1982 | Rakiov et al. | 251/126 |

FOREIGN PATENT DOCUMENTS

| | | | | |
|---|---|---|---|---|
| GB | 1448722 | * | 9/1976 | 137/331 |
| GB | 1600480 | * | 10/1981 | 251/126 |

* cited by examiner

Primary Examiner—George L. Walton
(74) Attorney, Agent, or Firm—Darby & Darby

(57) ABSTRACT

Pressurised medium apparatus with a valve.

18 Claims, 8 Drawing Sheets

VALVE PISTON AND VALVE EQUIPPED WITH SAME

The present invention relates to a valve with a valve piston more particularly for a control or regulating valve according to the preamble of claim 1. The invention also relates to a valve equipped with this valve piston according to claim 13 and to a pressurised medium apparatus for a motor vehicle having a pressurised medium source and a hydraulic consumer according to the preamble of claim 16.

Valve pistons of valves of the kind mentioned above are used as valve bodies in the case of piston valves or also slide valves, wherein they are also occasionally referred to as valve actuators.

In general terms a valve of this kind has a valve bore in which the valve piston is axially guided and axially displaceable. A valve of this kind can thereby be formed as a control valve and has the task of controlling the start, stop as well as direction and pressure of through-flow volumes of the fluid flow in a hydraulic system. With a control valve of this kind it is thus possible to influence the flow capacity in the hydraulic system or hydraulic apparatus.

Valve pistons of this kind can however also be used in a similar way in regulating valves where the behaviour of the regulated characteristic value has an influence on the input characteristic value of the regulating valve.

Common to the said valves is the fact that the valve piston in the valve bore is subjected to a reciprocating movement which takes place in the longitudinal direction of the valve bore. When the direction of movement of the valve piston is reversed the valve piston is initially braked and then accelerated again in the opposite direction. A valve piston which is formed as a pressure balance is at some time still also biased on one side by a spring which has a hysteresis in its characteristic.

When the valve piston moves in the valve bore which is filled at least in part with a pressurised fluid, for example a pressurised oil, as the valve piston changes its direction so changes in the friction state occur, namely transitions from the sliding friction state to the sticking friction state and then again into the sliding friction state as the valve piston takes up its movement again. This makes it clear that hysteresis phenomena also occur here which together with the spring hysteresis already mentioned, lead to a corresponding displacement of the characteristic. If for example the through flow characteristic through the valve is considered then the actual through flow characteristic differs from the theoretical through flow characteristic as a result of the hysteresis phenomena mentioned.

It has already been attempted to use when controlling a valve a control signal superimposed with a vibration. A valve with a pressurised medium apparatus is also known from DE196 26 520 A1 wherein the control value is generated from at least two control value parts wherein one control value part is modulated with a first frequency and the second control value is modulated with a second frequency.

This known valve can be used for example in a hydraulic pressurized medium apparatus in order to control the operating pressure supplied to a hydraulic consumer according to a desired characteristic.

FIG. 1 of the drawing shows by way of example a characteristic curve of the operating pressure over the time which arises when using the known valve previously described. As can be readily seen from the graphs however the use of this known valve leads to vibration problems as a result of vibrations superimposed in the control. Thus if this known valve is used for controlling a hydraulic consumer in a hydraulic system the pressure vibrations apparent in both the rising and falling branch of the characteristic are transferred through the pipeline system of the hydraulic apparatus also to the hydraulic consumer so that the pressure vibrations which are present have a negative influence on the operating behaviour. Also further control members are regularly provided in the pipelines of the hydraulic system in the form of valves on which the pressure vibrations of the known valve likewise have a negative effect.

If the pressure vibrations spreading out in the pipe line system meet for example seated valves (poppet valves), then the valve cone is excited so that this excitation leads to the valve cone striking its seat. It is readily apparent that this seat impact can also cause mechanical damage to the valve seats and valve cone.

In addition to the hysteresis leading to displacements of the characteristic with the hydraulic system equipped with the known valve, problems also arise relating to pressure vibrations which lead in general to problems regarding the stability of the component parts present in the hydraulic system and also have a negative effect on the work characteristic of the hydraulic consumers present in the system, for example can result in noises occurring as a result of the pressure vibrations. AS a result of the vibration which is superimposed on the control value, with the known valve it can furthermore lead to considerable wear on the valve bore since the valve piston of the known valve is set in relatively rapid reciprocating movement in the valve bore.

The object of the present invention is therefore, in order to remove the drawbacks outlined above, to provide a valve piston and a valve equipped therewith so that on the one hand the influence of the hysteresis on the characteristic curve is reduced and on the other hand any excitation to vibration in the hydraulic system is avoided. The risk of wear on the valve bore is also to be reduced.

To achieve this the invention has the features indicated in claim 1 relating to the valve piston. Advantageous developments of the valve piston are provided in the other claims. Furthermore the invention proposes a valve according to claim 13 to solve the problem outlined above relating to the valve. A use of the valve piston is given in claim 14 and a pressurised medium apparatus with a valve according to the invention has the features of claim 16.

The invention is based on the knowledge that the undesired hysteresis phenomena in the valve characteristic are caused to a considerable extent by the friction states described above when the valve piston reverses its direction of movement. The pressure vibrations existing in the hydraulic system are produced as a result of the superimposed vibrations in the control of the known valve piston controlled with a reciprocating control value. Both problems can be solved in that a valve piston is used which can dispense with control through an oscillating control value, and which eliminates the problems when reversing the direction of movement with the changes in the friction state.

The invention therefore provides a valve piston for a control or regulating valve to be mounted displaceable and axially guided in a valve bore wherein the valve piston has a fluid throughflow region which is designed so that the valve piston can be brought into rotation by the fluid passing through the fluid throughflow region.

By the term fluid throughflow region is thereby meant an area on the valve piston which, when the valve piston is located in the valve bore of a valve and the pressurised fluid is flowing through the valve, comes into contact with the flowing pressurised fluid. In other words therefore the fluid throughflow region of the valve piston according to the invention is designed so that the valve piston is driven to rotate through the fluid throughflow region of the valve piston, namely when the pressurised fluid of the hydraulic apparatus in which the valve is located enters into the valve bore, flows past the fluid throughflow region and flows out again from the valve bore.

Thus if the pressurised fluid of the hydraulic apparatus flows through the control valve or regulating valve equipped with the valve piston according to the invention, then the valve piston is set in rotation through the fluid flow by means of the fluid throughflow region so that the processes of reversing the direction of movement with the standstills which take place inbetween which lead to the hysteresis are no longer provided. Since there is no longer the necessity to control the valve piston according to the invention with a vibrating control value, the problem of the pressure vibrations superimposed in the hydraulic system is effectively eliminated at the same time. In order to keep the valve piston according to the invention constantly in motion, thus to keep it constantly rotating about its own longitudinal axis, the valve piston according to the invention can also be constantly subject to a secondary or auxiliary flow circuit in the hydraulic system and kept permanently in motion through a vane system or the like which is mounted on the valve piston and can also be located outside of the valve bore and in active connection with the valve piston.

The valve piston according to the invention can be used in an existing valve as a replacement for its valve piston since the valve bore of the valve need not be changed but only the valve piston of the valve already present need be exchanged for the valve piston according to the invention.

The valve piston according to the invention has adjoining the fluid throughflow region an edge for opening and closing an inlet to the valve bore. The inlet to the valve bore is thereby the area which is connected for example to a delivery pump or a hydro reservoir so that pressurised fluid can be introduced through the inlet to the valve bore into the valve having the valve piston according to the invention. The fluid flowing in under pressure flows round the fluid throughflow region of the valve piston and sets it in rotation. The inlet to the valve bore can be opened and closed by means of the edge adjoining the fluid throughflow region, a control edge, whereby the valve piston is biased for example by a pre-control valve or pilot valve with pressure so that it is rotated in the valve bore, driven by the fluid throughflow region, and can be axially displaced, controlled by the pilot valve, in the valve bore for opening and closing the inlet through the control edge.

The pressurised fluid which enters the supply inlet can leave the valve bore again through an opening and is supplied through a pipeline system to a hydraulic consumer. The pressurised fluid can bear on the hydraulic consumer with a lower pressure than the delivery pressure produced by the delivery pump, for which purpose the control valve is designed with the valve piston according to the invention by way of example as a pressure reducing valve.

When the hydraulic consumer does not have to perform any work the pressurised fluid present in its upstream pipeline system, thus the pipeline system between the valve and the hydraulic consumer, can be supplied through the valve piston preferably with practically no pressure to a tank for which purpose the valve piston has adjoining the fluid throughflow region an edge for opening and closing the outlet of the valve bore.

According to a further development of the invention the fluid throughflow region is thus formed so that the fluid passing through same exerts an impulse on the valve piston in the circumferential direction thereof so that the valve piston is set in rotation. To this end the fluid throughflow region can have an at least single-thread helical shaped groove profile such that the outer diameter of the groove profile, thus the flanks of the groove profile, corresponds substantially to the inner diameter of the valve bore and the core diameter of the groove, thus the diameter of the groove base is for forming a flow path between the groove flanks smaller than the inner diameter of the valve bore. When the pressurised fluid flowing into the valve bore through the inlet of same meets the valve piston it enters into a fluid throughflow region and flows over the at least single-thread helical groove profile existing there in the helical flow path between the groove flanks to an outlet of the valve bore against which for example the work or system pressure required on the consumer side has to bear, and exerts an impulse force on the valve piston as a result of the helical groove profile.

One or more spindle-shaped grooves are thus provided on the slider for the flow of pressurised fluid, thus for example oil, through the valve piston or valve slider.

When the oil flows through these grooves a change of direction of the flow takes place which is supported on the slider and transfers to this an impulse in the circumferential direction. The slider starts to rotate. As a result of the rotation of the slider still only sliding friction forces occur. Through this constant movement of the slider the characteristic hysteresis is clearly reduced. The number of grooves, the groove depth and the pitch of the groove spindle are thus influencing parameters which can influence the impulse exchange between the fluid and the slider and thus the circumferential forces as well as the rotational speed and can consequently be adapted to meet corresponding demands.

As a continuation of the invention the groove flanks run substantially at right angles to the core diameter of the groove profile so that a flow path for the pressurized fluid is produced which is substantially at right angles to the groove profile in a rectangular section. With this design the valve piston has no waist, as is the case for flow through the valve with known valve pistons.

In a continuation of the invention the fluid throughflow region of the valve piston has over substantially its entire length extension a cross-sectional surface area which can be formed circular ring-shaped in cross-section, but can also have for example a polygonal profile which is smaller than the cross-sectional surface area of the valve bore and on the cross-sectional surface area of the fluid throughflow region there is a fluid guide device which extends away outwards and which biases the valve piston with a force causing rotation as the fluid flows through.

The fluid throughflow region can therefore have instead of or in addition to the helical shaped groove profile mentioned above a fluid guide device in the form of at least one helically arranged row of pins on which the fluid flowing through the fluid throughflow region is supported and the reaction force sets the valve piston in rotation.

The fluid guide device can also be designed in the form of vane-like bodies on the cross-sectional surface area of the fluid throughflow region so that the fluid flowing through the fluid throughflow region is supported on these bodies and the reaction force sets the valve piston in rotation.

So that the valve piston does not cant or become inclined in the valve bore, the valve piston is provided in the area adjoining the fluid throughflow region with ring-shaped grooves through which a pressurised medium cushion can form in this area between the wall of the valve bore and the valve piston so as to centre the valve piston in the valve bore.

As a result of the hysteresis of a spring it is advantageous to operate the valve equipped with the valve piston according to the invention without any spring device.

It can equally be advantageous in the case of other valve designs it an additional resetting force is provided which is applied by a spring. If the valve piston according to the invention is used, biased for example through a precontrol or pilot valve with suitably high precontrol pressures, it can be advantageous if the valve piston is supported on the bottom of the valve bore through a spring. However so as not to have a negative influence on the rotation of the valve piston according to the invention it is advantageous if the spring is supported on the bottom of the valve bore substantially free of transverse forces. To this end the spring can be supported on the bottom of the valve bore through a spring pad with a moulded semi sphere in such a way that the semi-spherical shaped support point is located on the axis of rotation of the valve piston. As an alternative to this it is also possible for the spring to be supported on the bottom of the valve bore through a spring pad with sliding bearing and sliding disc whereby as a result of the presence of oil in the valve bore the friction between the sliding bearing and sliding disc is reduced so that the valve piston can turn substantially free of friction,. Finally it is also possible if the spring is supported on the bottom of the valve bore through a spring pad with an axially acting rolling bearing so that the spring is supported on the bottom of the valve bore substantially free of transverse forces. The rotation of the valve piston according to the invention about its own axis leads to the hysteresis phenomena in the characteristic of the valve equipped with the valve piston to be lifted or at least substantially reduced. Through the rotation it is thus also possible to replace the control of the valve piston otherwise required for reducing the hysteresis with a vibrating control value or however to superimpose the rotation on the vibrating control so that the resonance vibration problems already mentioned can be effectively eliminated.

As a result of the rotation of the valve slider according to the invention it is possible to reduce the wear between the slider and the valve bore since a lubricant film can be better produced through the rotation. For further improving the lubricant film it is also possible to provide indentations arranged staggered in the circumferential direction on the fluid throughflow region in the form of pockets or the like on the slider in order thus to improve the build-up of the lubricant film.

As already mentioned since the modifications required to overcome the problems described have been under taken on the valve piston according to the invention and need not be carried out on the valve bore, the valve piston according to the invention can be inserted in an already existing valve bore of a valve so that a valve with a valve piston according to the invention can be produced where the valve piston of a valve is exchanged for the valve piston according to the invention.

The valve piston according to the invention can advantageously be used as a control piston of a pressure reducing valve of a hydraulic pressurised medium apparatus. Thus the pressure reducing valve produced in this way can be used for controlling a hydraulic clutch, more particularly a hydraulic multi-plate clutch which is provided as a drive-away element of a continuously variable cone pulley belt contact gearbox. Spiral-shaped grooves provided on the valve piston in the passage area of the piston, the fluid throughflow region, direct the fluid on its way from the inlet to the work pressure outlet opening from the pressure reducing valve so that an impulse force acts on the slider and sets this in rotation. Rotation of the valve piston is thus maintained even when the valve piston changes the control edge and produces a through flow between the work pressure area and the tank connection. The production of the grooves described above can be achieved for example in that the valve piston is made from aluminium and the grooves are milled whereby the valve piston can then be provided with a hard oxide layer or the valve piston is made in cost-effective manner from plastics, for example a thermo-setting plastics through an injection moulding process and the grooves or the fluid guide devices are hereby made in the form of rows of pins or vane-like bodies together with the manufacture of the valve piston.

The valve which is equipped with the valve piston described above can be used for example in a pressure medium apparatus for a motor vehicle having a pressurised medium source and a hydraulic consumer in order to supply the hydraulic consumer with hydraulic pressurised fluid and/or to control or regulate the hydraulic consumer through the hydraulic pressurised fluid. Thus the fluid prepared by a delivery pump under pressure can flow through a pressure reducing valve equipped with the valve piston according to the invention to control a hydraulic multi-plate clutch. The spiral-shaped grooves arranged in the fluid throughflow region of the valve piston ensure that the fluid when passing through the passage area of the slider sets the valve piston in rotation so that the hysteresis phenomena described above in the characteristic of the work pressure required for controlling the multiplate clutch disappear or are at least substantially reduced by the rotation of the valve slider. Also it no longer results in pressure vibrations in the work or operating pressure to control the multi plate clutch so that the multi plate clutch, when it is used for example as a drive-away element of a continuously variable transmission, has its designated operating behaviour and the slipping engagement process of the multi plate clutch proceeds evenly and smoothly and is not disturbed by pressure vibrations in the control of the multi plate clutch.

Through the valve piston according to the invention and a valve equipped therewith, as a result of the constant rotation of the valve piston not only can the hysteresis be minimised but also the problems of pressure vibrations in the control of a hydraulic consumer can be eliminated since it is no longer absolutely necessary to bias the rotating valve piston with a vibration control value to minimise the hysteresis. The valve piston according to the invention can be used in an already existing valve bore which need not be altered for this purpose and provides as a result of the lubricant film building up through the development of rotary pressure between the valve bore and the valve piston a bearable lubricant film is which effectively eliminates the problem of wear on the valve bore.

The invention will now be explained in further detail with reference to the drawings in which.

Figure 6A:
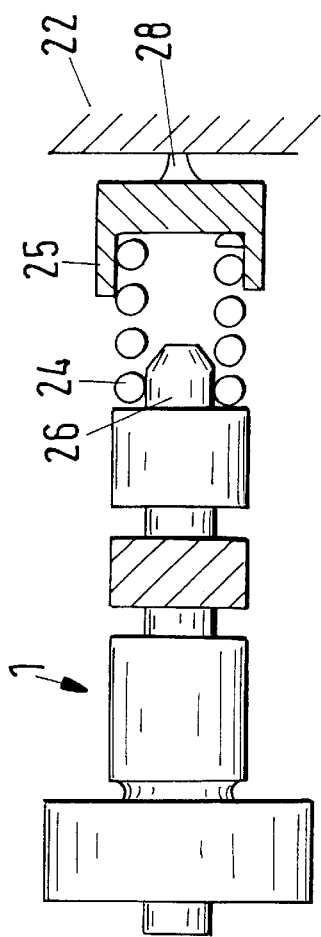
Figure 7:
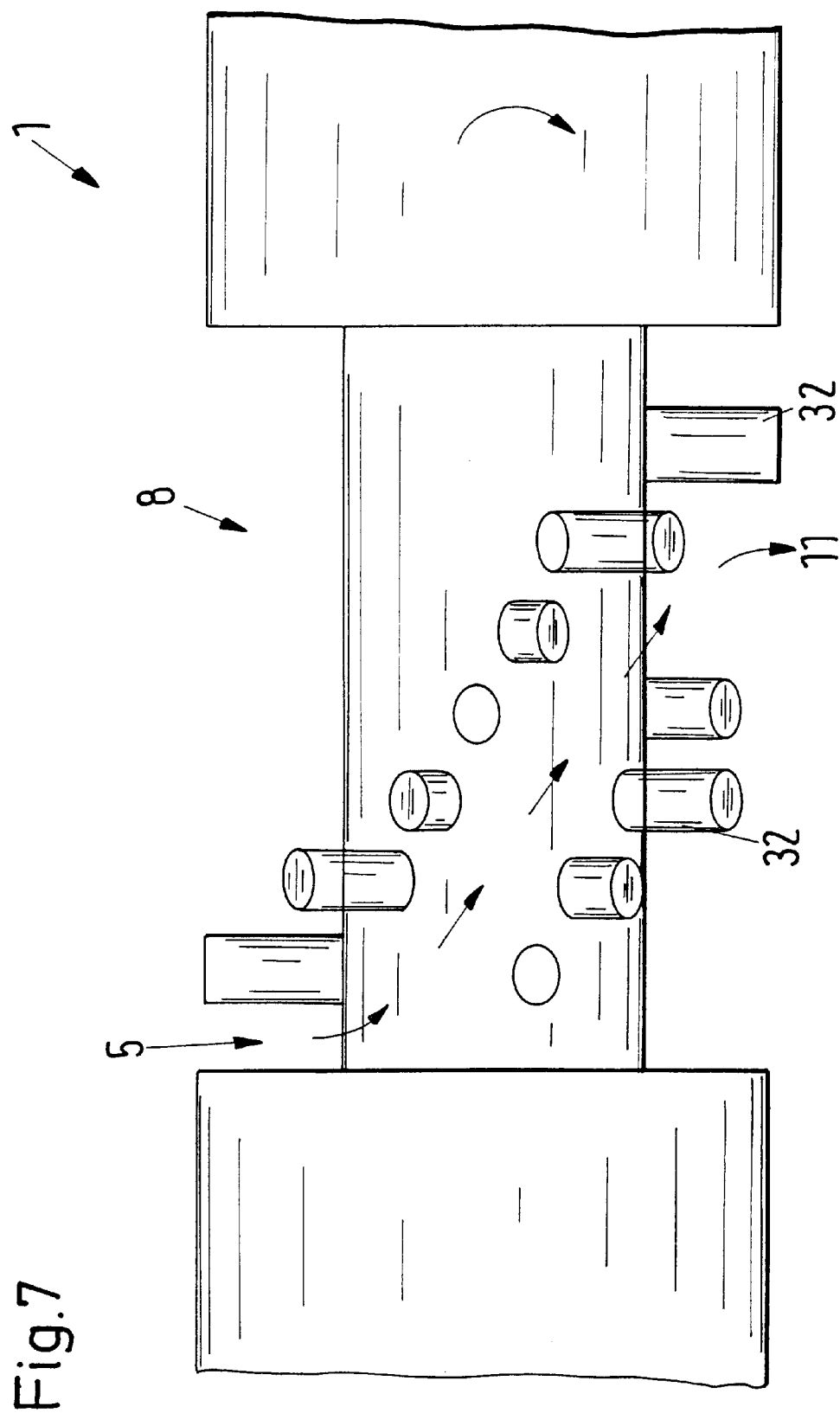
Figure 8:
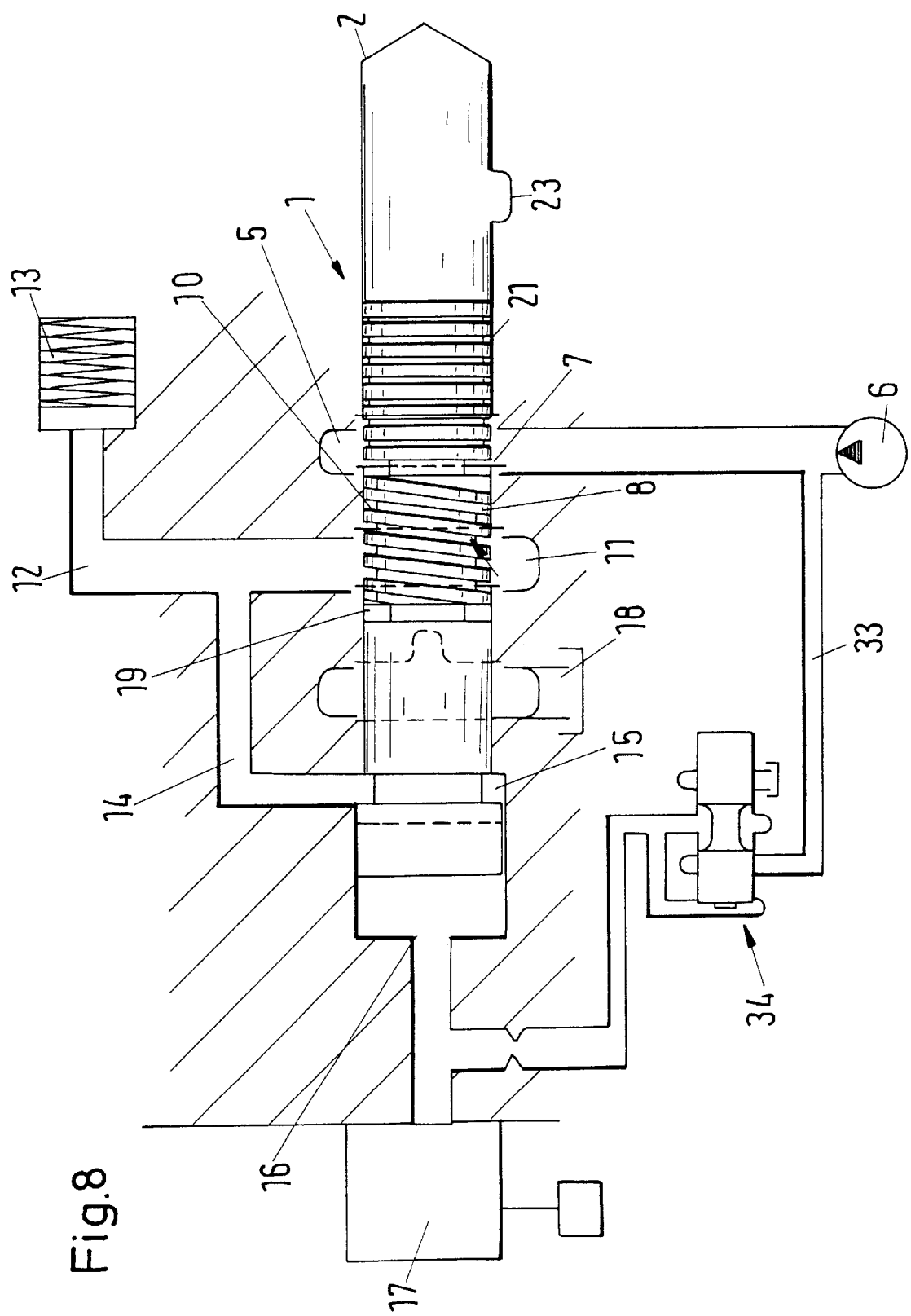

FIGS. 6A,B,C,D are diagrammatic illustrations of a spring-loaded valve piston according to the invention with different spring pad variations;

FIG. 7 is a diagrammatic illustration of the valve piston according to the invention in one embodiment having rows of pins arranged in helical formation; and FIG. 8 is a diagrammatic illustration of a pressurised medium apparatus having a valve with the valve piston according to the invention.

Figure 1:
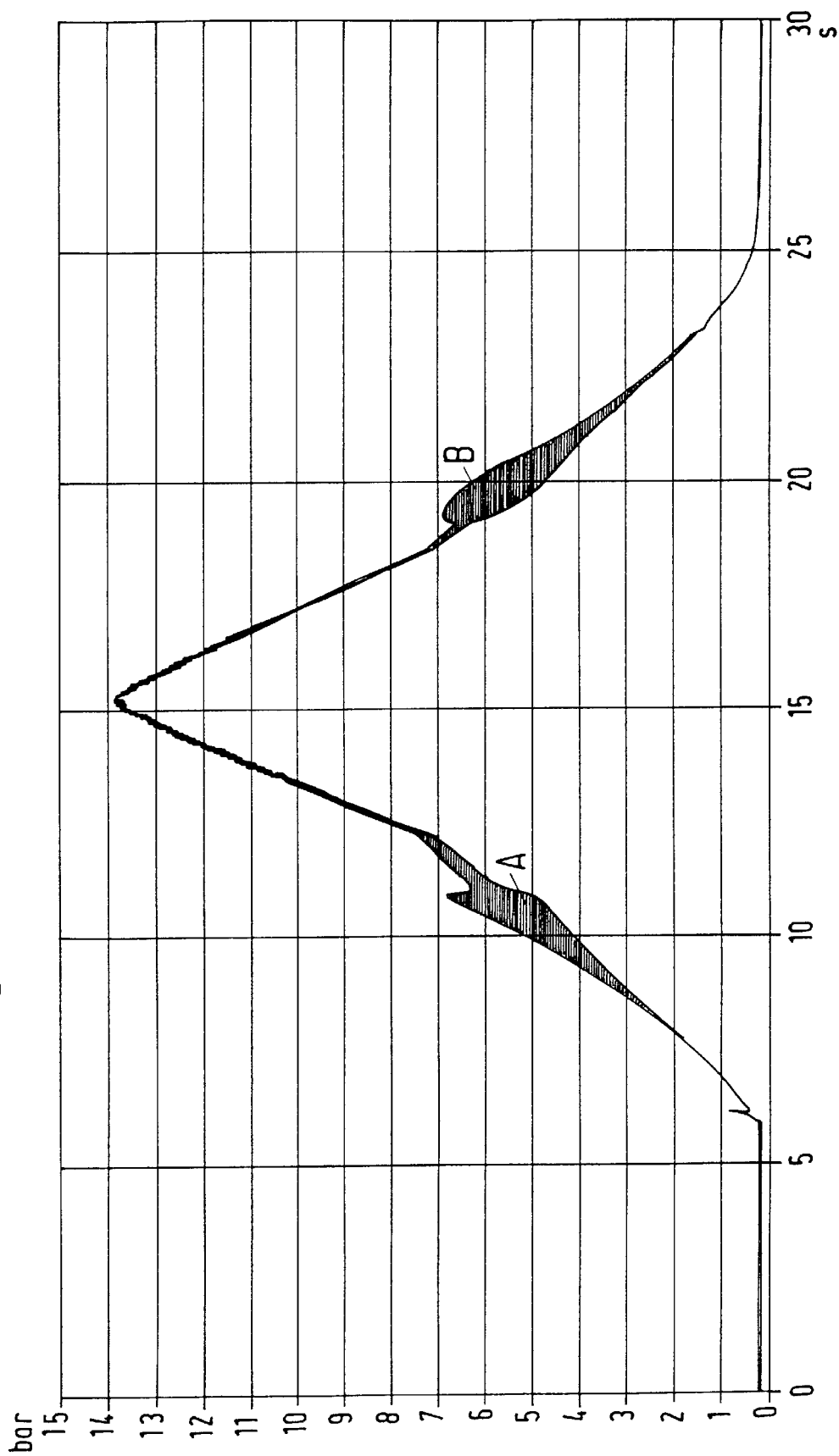
FIG. 1 is a diagram of the path of the operating pressure over time of a valve with a known valve piston to explain the problems of vibration.

FIG. 1 of the drawing shows a path of the operating pressure or system pressure, entered over the time, in a hydraulic pressurised medium apparatus using a known valve whose valve piston is controlled with a reciprocating control value in order to fight the appearance of hysteresis in the path of the characteristic of the pressure.

As can be readily seen pressure vibrations occur both in the rising branch and in the falling branch of the characteristic path according to FIG. 1. In the branch rising on the left, after a short period of time with a rising operating pressure a vibration in the pressurised medium occurs, which is marked at A. As a result of the arrangement of the known valve in a pressurised medium apparatus, leading to vibration of the pressurised medium, this pressure vibration also continues in the pipeline system which is connected in after the valve. This means that the pressurised medium vibration also occurs in the case of a hydraulic consumer, boar vary of example, a multi-plate clutch. With a slipping engagement process of the multi-plate clutch this pressurized medium vibration therefore leads to a so-called vibrating engagement process. When the multi-plate clutch controlled with a pressurised medium vibration is used as a drive-away element in a motor vehicle, this vibrating engagement process is then transmitted to the entire vehicle so that a clear loss of comfort can occur.

Also in the falling branch of the path of the characteristic according to FIG. 1 a vibration of the pressurised medium occurs, marked at B, the effect of which is clearly less than that of the pressurised medium vibration A since the multi-plate clutch has already been substantially fully engaged and the entire inertia mass of the motor vehicle now opposes the vibration process. Since however engagement processes occur extremely frequently with the aid of the multi-plate clutch in the case of a motor vehicle, pressurised medium vibrations in the multi-plate clutch occur with corresponding frequency.

Figure 2:
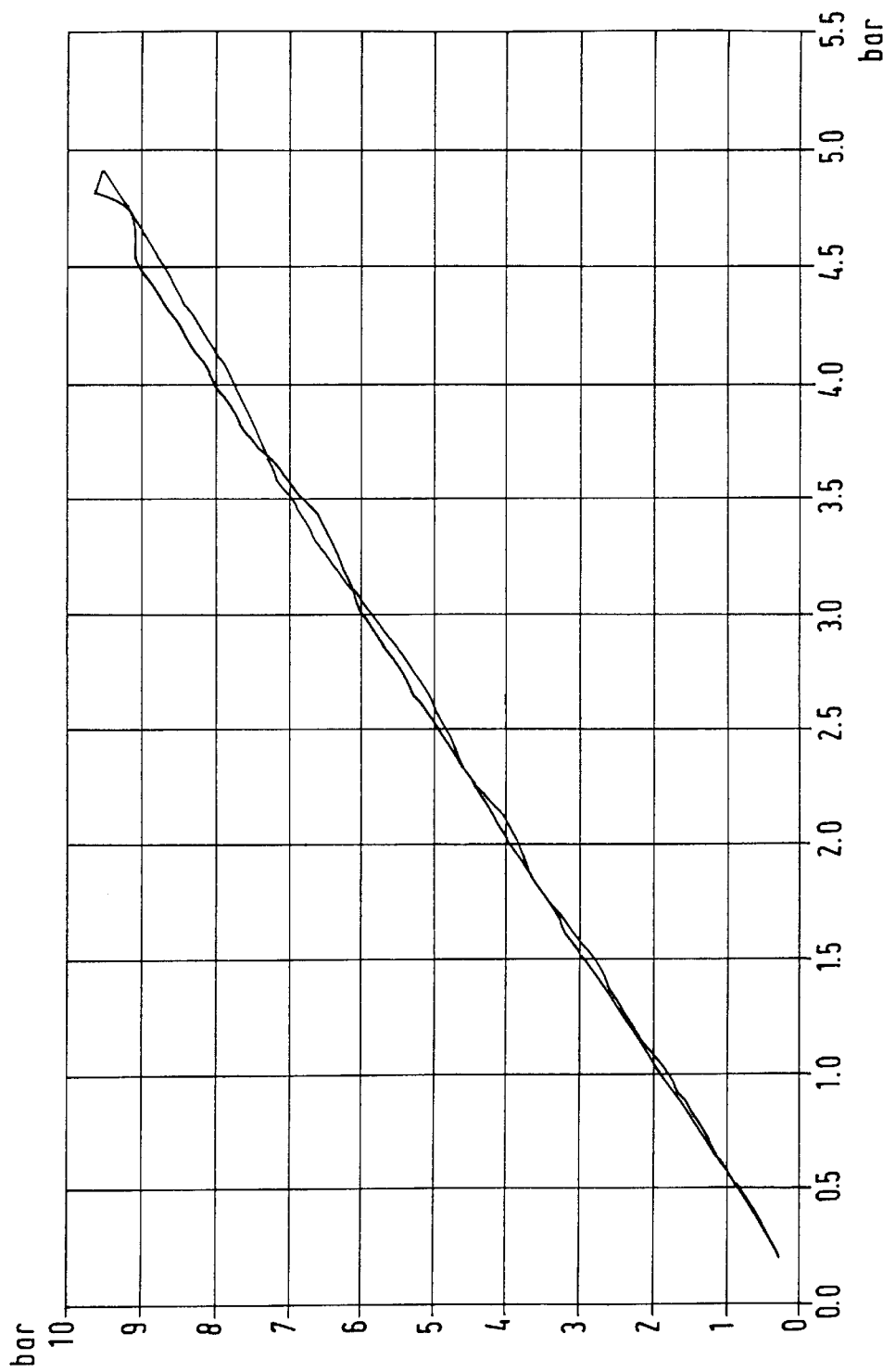
FIG. 2 is a diagram with a characteristic of the operating pressure entered over the precontrol pressure of a pilot valve of a known valve to explain the hysteresis phenomena.

FIG. 2 of the drawings shows a diagram with the path of the characteristic of the operating pressure or system pressure produced by the known valve entered over the precontrol pressure of a pilot valve, namely for a complete work cycle. The work cycle thereby means that the valve piston of the known valve has been displaced over its entire control stretch, namely by loading and then relaxing the piston control surface biased by the precontrol pressure. After the substantially linear rise of the work pressure, the pressure characteristic in the event of relaxation runs displaced by a certain amount relative to the rising characteristic branch. This means that a characteristic hysteresis occurs which is finally expressed in a change in the working characteristic of the hydraulic consumer biased by the work pressure.

Figure 3:
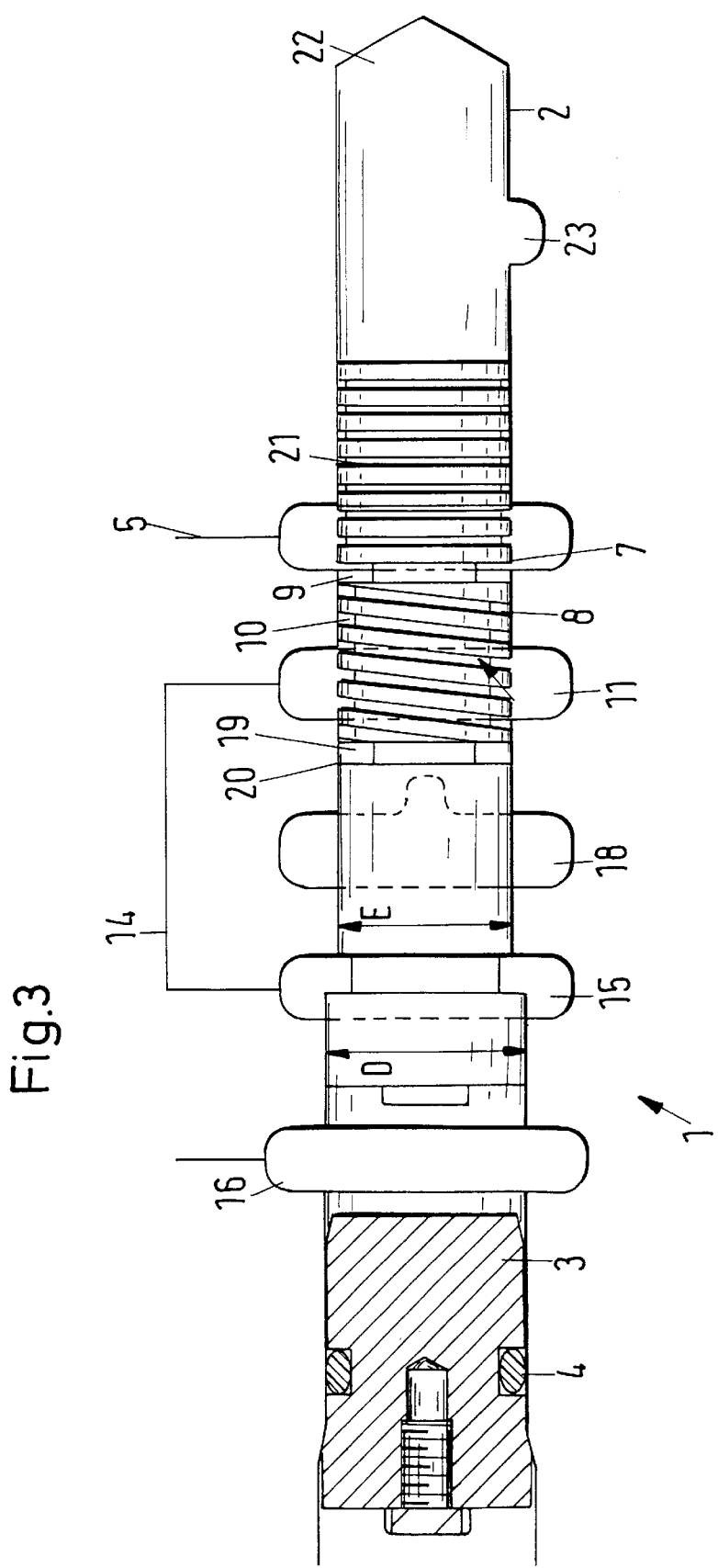
FIG. 3 is a diagrammatic illustration of a valve piston according to the invention which is located in a valve bore.

FIG. 3 of the drawing shows using a diagrammatic illustration a valve piston 1 according to the invention which is housed displaceable and axially guided in a valve bore 2.

The valve bore 2 can thereby be a bore for housing the valve piston 1 of a valve which is already present so that a valve piston (not shown) of an already existing valve is exchanged for the valve piston 1 according to the invention.

To this end a closure stopper 3, shown on the left-hand side of FIG. 3, is provided on the valve bore 2 and seals the valve bore 2 through an O-ring seal 4 provided on the outer circumference. After removing the closure stopper 3 the valve piston 1 according to the invention can be pushed into the valve bore 2 whereupon the valve stopper 3 is then inserted again into the valve bore 2 and fixed there.

The valve shown diagrammatically in FIG. 3 is a pressure reducing valve for controlling a hydraulic multi-plate clutch. The installation position of the valve will be explained below in further detail with reference to FIG. 8 of the drawings.

The valve bore 2 is provided with an inlet, marked by reference numeral 5, through which a pressurised fluid, such as hydraulic oil, which is supplied under pressure from a delivery pump 6 (FIG. 8), can be introduced into the valve bore 2. When the hydraulic oil has been passed in this way through the inlet 6 to the valve bore 2 it meets the control edge area of the valve piston 1 on the inlet side with a control edge 7. With the position of the valve piston 1 illustrated in FIG. 3 the piston has been moved slightly to the right in the valve bore 2 so that the control edge 7 releases the inlet 5 and the pressurised fluid supplied by the pump 6 can enter into the fluid throughflow region 8 of the valve piston 2.

To this end the fluid throughflow region 8 is provided on the inlet side with a circumferential ring groove 9 which as a result of its relatively small internal diameter or core diameter allows the pressurised fluid to enter the fluid throughflow region 8 of the valve piston 1 without problem.

When the pressurised fluid has thus passed into the through-flow area of the valve piston 1 it enters into a helical groove 10 (shown diagrammatically) of the fluid throughflow region 8.

The hydraulic oil therefore flows along this through channel formed as a spindle-shaped groove between the groove base and the inner diameter of the valve bore 2 and is here subjected to a change of flow direction which is supported on the slider, the valve piston 1, and transmits an impulse to same in the circumferential direction. The valve piston 1 starts to rotate and only more sliding friction forces arise between the valve piston 1 and the valve bore 2. This constant rotational movement of the valve piston 1 produces a clear reduction in the characteristic hysteresis, as will be explained below in further detail with reference to FIG. 4 of the drawings.

The number of grooves, the groove depth and the pitch of the groove spindle are thereby parameters which can influence the impulse exchange between the fluid and slider and thus the circumferential forces as well as the rotational speed.

Thus it is only necessary to provide at least one spiral-shaped groove although several such grooves can be formed on one valve piston 1 and in a preferred embodiment the grooves can have a depth of at least 1 mm, preferably 2 mm, a width of at least 1 mm, preferably 1.5 mm and a depth of at least 1 mm, preferably 2 mm. The axial length of the fluid through low region 8 of the valve piston 1 can thereby reach, starting from a length corresponding to a groove length sufficient to turn the valve piston 1, up to several millimetres, thus can reach for example from 2 mm to 50 mm, and more particularly amount to about 10 mm.

The fluid flowing along the helical groove 10 sets the valve piston 1 in rotation and flows along the helical flow path up to a work pressure area 11 where it can be diverted from the valve bore 2 in order to be supplied through a pipeline assembly 12 with reduced pressure to a hydraulic consumer 13, the multi-plate clutch. The pressure of the hydraulic fluid prevailing in the work pressure area 11 spreads through a pressurised medium pipe 14 to a shoulder 15 mounted on the valve piston 1 where a force difference arises through the difference in the diameters of the cross-sectional surface areas D and E. This shoulder 15 is then adjoined by a precontrol chamber 16, shown on the left hand side of FIG. 3, which can be controlled with the precontrol pressure of a precontrol valve 17 (see FIG. 8). The pipeline arrangement 12 can be relaxed substantially pressure-free through a tank connection 18 by the axial displacemnet of the valve piston 1 in the valve bore 2. To this end the precontrol pressure existing in the precontrol chamber 16 is reduced so that through the difference in surface areas of the cross-sectional surfaces D and B a force component is produced which moves the valve piston 1 to the left in the valve bore 2 so that the control edge 7 shuts of the inlet 5 and the oil present in the fluid throughflow region 8 and which-, is then fed further out from the pipeline arrangement 12, can flow through a ring groove 19 and a control edge 20, displaced to the left in the tank connection area 18, out from the fluid throughflow region. Even then if the valve piston 1 changes its control edge, i.e. the control edge 20 passes into the area of the tank connection 18, the valve piston 1 is set in rotation as a result of the flow of oil out from the pipeline arrangement 12 through the fluid throughflow region a formed with a helical groove.

The valve piston 1 has in its area adjoining the fluid throughflow region and coming into contact with the inlet several centring grooves 21 which can be provided over a pressure cushion between the valve piston 1 and the valve bore 2 to ensure that the valve piston 1 rotates centred in the valve bore 2.

In the bottom 22 of the valve bore 2 there is an outlet 23 through which hydraulic oil passing into the bottom 22 of the valve bore 2 can be returned back into the circuit.

Figure 4:
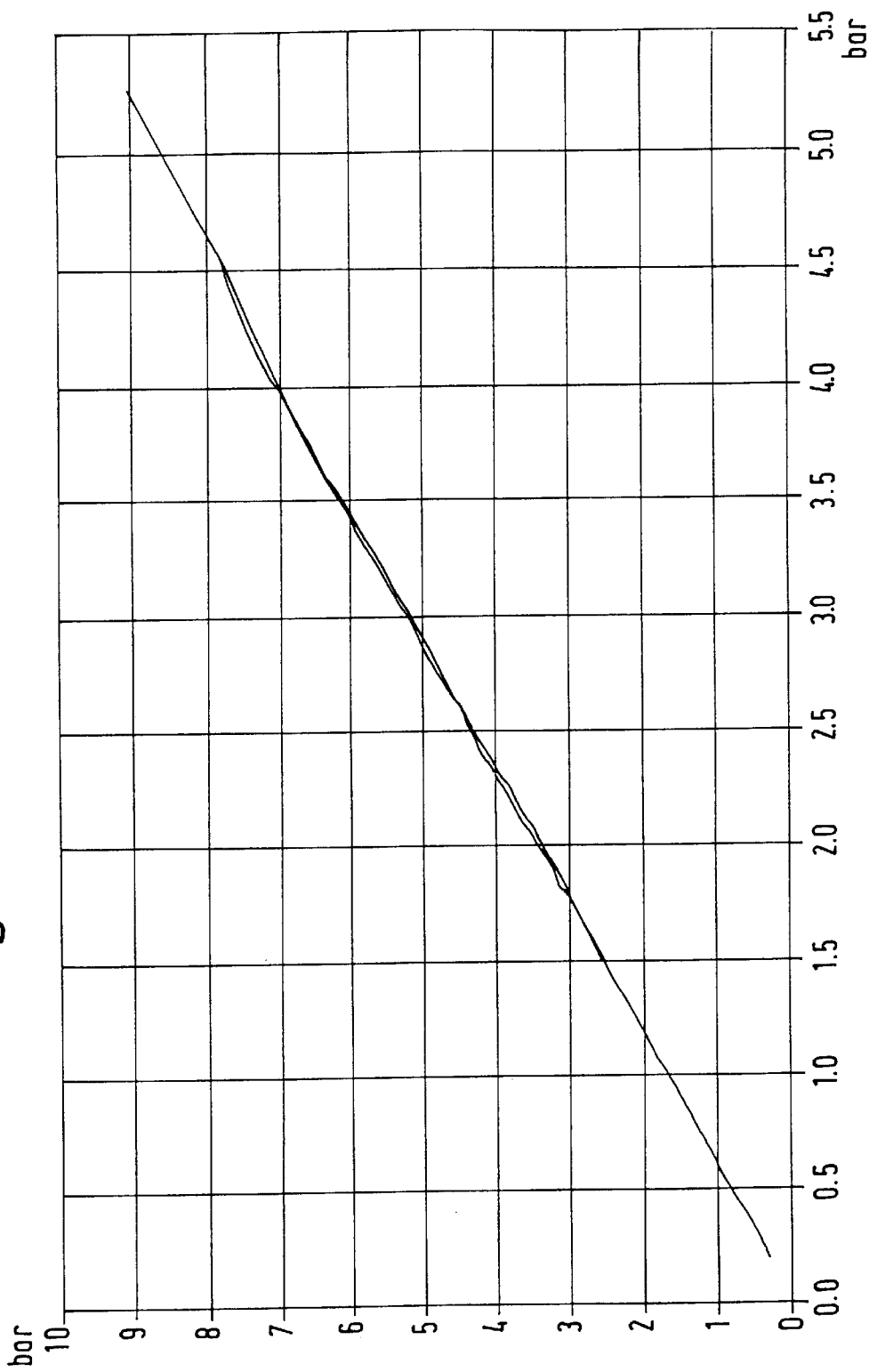
FIG. 4 is a diagram of the operating pressure characteristic, entered over the precontrol pressure, wherein the characteristic was obtained by using a valve conforming to the present invention.

FIG. 4 of the drawing shows a characteristic path of the working pressure entered over the precontrol pressure similar to FIG. 2 wherein the path shown in FIG. 4 is produced using a valve with the valve piston 1 according to the invention.

As can be easily seen by comparing the diagrams of FIG. 2 and FIG. 4 the valve piston 1 according to the invention leads to a practically complete overlap between the rising and falling pressure branch in the working or system pressure. The hysteresis appearances clearly visible in FIG. 2 in the form of spaces between the curves have disappeared in FIG. 4 over substantially the entire characteristic path.

Figure 5:
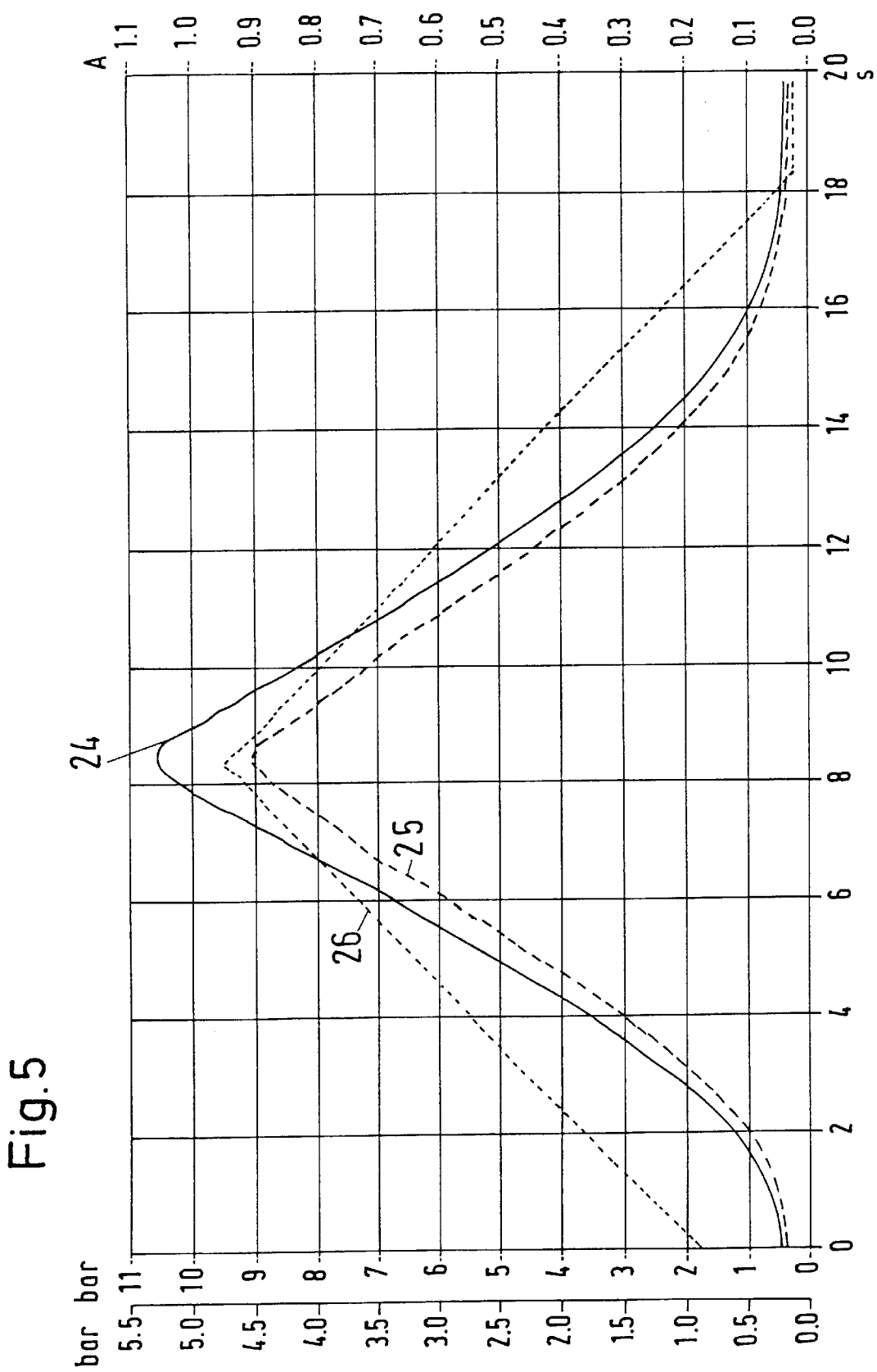
FIG. 5 is a diagram of the operating pressure and precontrol pressure as well as an electric current entered over the time, which was obtained by using a valve with the valve piston according to the invention, to compare the operating pressure characteristic of the valve according to the invention with the operating pressure characteristic of a known valve according to FIG. 1.

In a similar way FIG. 5 shows a behaviour which is clearly improved with regard to the problems of vibration described above in the working pressure for the hydraulic consumer 13. The pressure vibrations in the path of the working pressure entered over the time, illustrated in FIG. 1, have completely disappeared in the characteristic 24. This means in other words that the use of a pressure reducing valve equipped with the valve piston 1 conforming to the invention for controlling the multi-plate clutch 13 results in the multi-plate clutch being controlled without pressure vibrations and thus the slipping engagement process can proceed entirely without force shocks and thus the coupling process proceeds without any vibration excitations being transmitted to the vehicle FIG. 5 of the drawings also shows the characteristic, marked by reference numeral 25, of the path of the precontrol pressure of the precontrol valve 17 entered over the time and reference numeral 26 indicates the precontrol current bearing on the precontrol valve 17.

FIG. 6A shows in a diagrammatic illustration a valve piston 1 which is supported by a spring 24 and spring bearing 25 against the bottom 22 of the valve bore 2 (not shown in further detail). The valve piston 2 thereby has centring means 26 at its end associated with the spring 24 in order to centre the spring 24. The sleeve-like spring bearing 25 encloses some threads of the spring 24 and has at its end area opposite the spring 24 a cone 28 for support on the bottom 22 free of transverse forces. The cone 28 ensures that the rotation of the valve piston 1 is not obstructed since the spring bearing 25 rests by points through the cone 28 on the bottom 22 of the valve bore 2.

Figure 6B:
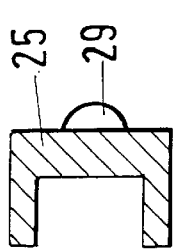

FIG. 6B of the drawing shows a spring bearing 25 in a modified form so that instead of the cone 28 a semi-sphere 29 is provided which leads to a spot contract between the spring bearing 25 and the bottom 22.

Figure 6C:
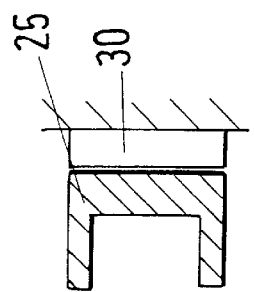

As an alternative to this the spring bearing 25 can, as shown in FIG. 6C, also be designed in the form of an anti-friction bearing with a sliding disc 30 so that as a result of the oil present in the gap between the spring bearing 25 formed as an anti-friction bearing and the sliding disc 30 a lubricant film is formed between the spring bearing 25 and the sliding disc 30 to allow an arrangement free of transverse forces.

Figure 6D:
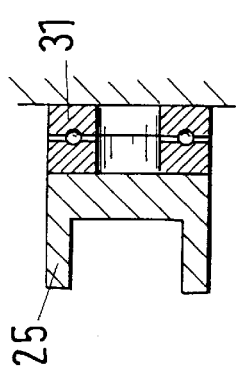

FIG. 6D finally shows a further embodiment of a spring bearing 25 which is supported free of transverse forces on the bottom 22 of the valve bore 2 by a rolling bearing 31.

FIG. 7 of the drawing will now be described in further detail which shows on an enlarged scale the fluid throughflow region 8 of the valve piston 1. With this embodiment of the valve piston 1 rows 32 of pins are arranged helically in the fluid throughflow region 8 so that pressurised fluid flowing in through the inlet 5 is deflected at the rows 32 of pins 32, as can be readily seen from the flow path shown by the arrows, so that this deflection again ensures rotation of the valve piston 1. The hydraulic oil entering through the inlet 5 leaves the fluid throughflow region 8 of the valve piston 1 through the work pressure opening which is marked by reference numeral 11 and is only shown diagrammatically.

The provision of the single or multi-threaded helical groove 10 can be achieved by milling a valve piston 1 which is made for example of aluminium, or however the complete valve piston 1 can also be made by injecting moulding a plastics, e.g. a thermosetting plastics. The rows 32 of pins can be arranged in the fluid throughflow region 8 of the valve piston 1 so that the valve piston 1 is reduced to the diameter range required and the pins of the rows 32 of pins are fitted at the area of reduced diameter.

FIG. 8 of the drawings shows diagrammatically a pressurised medium apparatus with a valve piston 1 conforming to the invention and located displaceable and axially guided in a valve bore 2.

A fluid supplied to the inlet 5 under pressure from the delivery pump 6 enters into the fluid throughflow region 8 controlled by the control edge 7 and biases the helical groove 10 provided there, so that the impulse transmitted in the circumferential direction ensures that the valve piston 1 is set in rotation.

After flowing through the fluid throughflow region 8 the pressurised fluid flows out in the working pressure area 11 and into the pipeline arrangement 12 which ensures that the hydraulic multi-plate clutch 13 is supplied with working pressure or system pressure. The system pressure present in the pipeline arrangement 12 also prevails in the area of the shoulder 15 through the pipeline 14.

The chamber 16 in front of the valve piston 1 is biased with precontrol pressure through a branch circuit 33 having a pressure reducing valve 34 and a precontrol valve 17 The valve piston 1 can move easily in the valve bore through rotation supported on a rotary pressure cushion against the stationary wall of the valve bore 2 so that physical contact between the valve piston 1 and valve bore 2 does not take place which eliminates the risk of wear on the valve bore. The grooves 21 of the valve piston 1 serve as centring grooves and ensure that an inclined position of the valve piston 1 in the valve bore 2 can be prevented.

A valve equipped with the valve piston 1 conforming to the invention is characterised in that hysteresis phenomena in its working characteristic are substantially eliminated. The need for controlling the valve piston 1 with a reciprocating control value is avoided so that pressure vibrations no longer occur in the working pressure produced by the valve The danger of resonance vibrations of the valve piston 1 as a result of the lack of control through a reciprocating control value has likewise been removed. Furthermore the valve piston 1 ensures as a result of its rotation in a valve bore 2 the formation of a bearing lubricant film so that the risk of wear on the valve bore 2 has likewise been eliminated. The devices required to produce rotation of the valve piston 1 are, restricted to the valve piston so that a valve piston 1 conforming to the invention can also be used in an already existing valve bore and modifications to the valve bore itself are not necessary.

For individual features of the invention not explained in further detail reference is made expressly to the claims and drawings.

A pressurised medium apparatus having a valve with valve piston 1 more particularly for a control or regulating valve to be fitted displaceable and axially guided in a valve bore 2 is proposed wherein the valve piston 1 has a fluid throughflow region 8 and this fluid throughflow region 8 is formed so that the valve piston 1 can be set in rotation by the fluid entering in through the fluid throughflow region 8. Furthermore a valve having this valve piston 1 is also proposed.

The patent claims filed with the application are proposed wordings without prejudice for obtaining wiser patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

I claim:

1. Valve having a valve piston axially displaceably guided in a valve bore, wherein the valve piston has a fluid throughflow region formed on an outside circumference of the valve piston and arranged in contact with the valve bore, the fluid throughflow region being formed as at least one helical groove having a helix pitch, a groove width and a groove depth such that fluid passing through the helical groove generates a reaction force on the valve piston in the circumferential direction to keep the valve piston in constant rotation for reducing friction and substantially eliminating frictional hysteresis between the valve piston and the valve bore.

2. Valve more particularly according to claim 1 wherein the valve piston has adjoining the fluid throughflow region an edge for opening and closing a supply inlet to the valve bore.

3. Valve more particularly according to claim 1 or 2 wherein the valve piston has adjoining the fluid throughflow region an edge for opening and closing an outlet from the valve bore.

4. Valve according to claim 1, wherein the at least one helical groove has groove flanks and a profile such that the outer diameter of the groove corresponds generally to the inner diameter of the valve bore, and the core diameter of the groove is smaller than the inner diameter of the valve bore to form a flow path between the groove flanks.

5. Valve more particularly according to claim 4 wherein the groove flanks run substantially at right angles to the core diameter of the groove profile.

6. valve more particularly according to claim 1 wherein the valve piston has in the area adjoining the fluid throughflow region a valve piston centring device.

7. Valve more particularly according to claim 1 wherein the valve piston is supported on the bottom of the valve bore by a spring.

8. Valve more particularly according to claim 7 wherein the spring is supported on the bottom of the valve bore substantially free of transverse forces.

9. Valve more particularly according to claim 7 or 8 wherein the spring is supported on the bottom of the valve bore through a spring pad having a moulded semi-sphere.

10. Valve more particularly according to claim 7 or 8 wherein the spring is supported on the bottom of the valve bore through a spring pad with sliding bearing and sliding disc.

11. Valve more particularly according to claim 7 or 8 wherein the spring is supported on the bottom of the valve bore by a spring pad with an axial rolling bearing.

12. Valve more particularly according to claim 7 or 8 wherein the spring is supported on the bottom of the valve bore by a spring pad with a cone.

13. Valve with a valve piston according to claim 1.

14. Use of a valve according to claim 1 as a control piston of a pressure valve, a flow valve or a rout e valve of a hydraulic pressurised medium apparatus.

15. Use of the valve according to claim 1 as a control piston of a reducing valve or a restricting valve.

16. Pressurised medium apparatus for a motor vehicle having a pressurized medium source and a hydraulic consumer, characterised by at least one valve according to claim 13 for supplying the hydraulic consumer with hydraulic pressurised fluid and/or for controlling or regulating the hydraulic consumer through the hydraulic pressurized fluid.

17. Valve having a valve piston axially displaceably guided in a valve bore, wherein the valve piston has a fluid throughflow region with a smaller cross-sectional surface area than the valve bore, and a fluid guide device extending outwardly from the cross-sectional surface area of the fluid throughflow region comprising at least one helically arranged row of pins having a helix pitch, a pin height, pin diameter, and spacing between pins such that the fluid passing through the fluid throughflow region is deflected into a helical flow pattern, thereby generating a circumferentially directed reaction force on said row of pins to keep the valve piston in constant rotation for reducing friction and substantially eliminating frictional hysteresis between the valve piston and the valve bore, the fluid throughflow region being formed on an outside circumference of the valve piston and a portion of the valve piston being arranged in contact with the valve bore.

18. Valve having a valve piston axially displaceably guided in a valve bore, wherein the valve piston has a fluid throughflow region with a smaller cross-sectional surface area than the valve bore, and a fluid guide device extending outwardly from the cross-sectional surface area of the fluid throughflow region comprising vane-like bodies having a pitch angle, height, width, and spatial arrangement such that fluid passing through the fluid throughflow region is deflected by the vane-like bodies from an axial flow direction into a circumferential flow direction, thereby generating a circumferentially directed reaction force on said vane-like bodies to keep the valve piston in constant rotation for reducing friction and substantially eliminating frictional hysteresis between the valve piston and the valve bore, the fluid throughflow region being formed on an outside circumference of the valve piston and a portion of the valve piston being arranged in contact with the valve bore.

* * * * *